United States Patent
Moyer

(10) Patent No.: US 9,213,524 B2
(45) Date of Patent: *Dec. 15, 2015

(54) METHOD AND DEVICE FOR GENERATING FLOATING-POINT VALUES

(71) Applicant: William C. Moyer, Dripping Springs, TX (US)

(72) Inventor: William C. Moyer, Dripping Springs, TX (US)

(73) Assignee: FREESCALE SEMICONDUCTOR, INC., Austin, TX (US)

(*) Notice: Subject to any disclaimer, the term of this patent is extended or adjusted under 35 U.S.C. 154(b) by 187 days.

This patent is subject to a terminal disclaimer.

(21) Appl. No.: 14/040,795

(22) Filed: Sep. 30, 2013

(65) Prior Publication Data

US 2015/0095393 A1    Apr. 2, 2015

(51) Int. Cl.
| | |
|---|---|
| G06F 7/38 | (2006.01) |
| G06F 7/483 | (2006.01) |
| G06F 7/499 | (2006.01) |
| G06F 9/30 | (2006.01) |

(52) U.S. Cl.
CPC ............ *G06F 7/483* (2013.01); *G06F 7/49905* (2013.01); *G06F 9/30007* (2013.01)

(58) Field of Classification Search
CPC ...................................... G06F 7/483
USPC ........................................ 708/495
See application file for complete search history.

(56) References Cited

U.S. PATENT DOCUMENTS

| | | | |
|---|---|---|---|
| 5,481,489 A | 1/1996 | Yanagida et al. | |
| 5,748,516 A | 5/1998 | Goddard et al. | |
| 5,931,943 A | 8/1999 | Orup | |
| 6,009,511 A | 12/1999 | Lynch et al. | |
| 6,138,135 A | 10/2000 | Karp | |
| 6,170,001 B1 | 1/2001 | Hinds et al. | |
| 6,519,694 B2 | 2/2003 | Harris | |
| 6,560,623 B1 * | 5/2003 | Smith | ........................... 708/551 |
| 6,976,050 B2 | 12/2005 | Steele, Jr. | |
| 7,069,288 B2 | 6/2006 | Steele, Jr. | |
| 7,133,890 B2 | 11/2006 | Steele, Jr. | |
| 7,191,202 B2 | 3/2007 | Steele, Jr. | |
| 7,228,324 B2 | 6/2007 | Steele, Jr. | |
| 2010/0217579 A1 | 8/2010 | Li et al. | |

OTHER PUBLICATIONS

U.S. Appl. No. 13/841,242, filed Mar. 15, 2013, entitled "Method and Device for Handling Data Values".
U.S. Appl. No. 13/841,630, filed Mar. 15, 2013, entitled "Method and Device for Generating an Exception".
Non-Final Office Action mailed Apr. 28, 2015 for U.S. Appl. No. 13/841,630, 16 pages.
Non-Final Office Action mailed May 15, 2015 for U.S. Appl. No. 13/841,242, 7 pages.
Final Office Action mailed Aug. 17, 2015 for U.S. Appl. No. 13/841,630, 5 pages.
Final Office Action mailed Aug. 26, 2015 for U.S. Appl. No. 13/841,242, 5 pages.
US 5,987,901, 11/1999, Luedtke et al. (withdrawn)

* cited by examiner

*Primary Examiner* — Tan V. Mai

(57) ABSTRACT

A floating-point value can represent a number or something that is not a number (NaN). A floating-point value that is a NaN includes a portion that stores information about the source operands of the instruction.

20 Claims, 3 Drawing Sheets

9,213,524 B2

METHOD AND DEVICE FOR GENERATING FLOATING-POINT VALUES

CROSS-REFERENCE TO RELATED APPLICATION(S)

The present application is related to co-pending U.S. patent application Ser. No. 13/841,242, entitled "METHOD AND DEVICE FOR HANDLING DATA VALUES," filed on Mar. 15, 2013, and co-pending pending U.S. patent application Ser. No. 13/841,630, entitled "METHOD AND DEVICE FOR GENERATING AN EXCEPTION," filed on Mar. 15, 2013, the entirety of which are herein incorporated by reference.

BACKGROUND

1. Field of the Disclosure

The present disclosure relates to electronic devices, and more specifically to data processing devices having floating-point processing capabilities.

2. Description of the Related Art

Data processing devices may use integer numbers or floating-point numbers to carry out computations. Floating-point numbers are used for calculations involving very large or very small numbers, and are typically represented within registers of a data processing device by formats that define locations for storing exponent and mantissa (significant) information. Floating-point formats, including that specified by IEEE 754, allow for floating-point values to be stored that represent floating-point numbers or that represents something other than a floating-point number (a non-floating-point number) in response to conditions that can arise during a floating-point calculation. For example, the result of dividing zero by zero is not a floating-point number in the normal sense, nor is multiplying infinity by zero. Thus, a floating-point format can specify a particular manner to store information that by definition is a floating-point value that represents a floating-point result that is not a number. A floating-point value that represents something other than a floating-point number or infinity is referred to as a "NaN", or a "NaN value".

NaN values may participate as operands, e.g., input data, of floating-point instructions in some data processing systems. An operand having a NaN value can be referred to as an "operand that is a NaN", or as a "Nan operand". When a NaN instruction generates a NaN resultant by virtue of receiving a NaN operand, the NaN operand is said to be propagated, and the NaN resultant can be referred to as propagated, e.g., a propagated NaN resultant. Alternatively, a NaN resultant can be calculated based only upon Non-NaN values, such as floating-point numbers. A resultant having a NaN value can be referred to as "resultant that is a NaN", or as a "NaN resultant".

BRIEF DESCRIPTION OF THE DRAWINGS

The present disclosure may be better understood, and its numerous features and advantages made apparent to those skilled in the art by referencing the accompanying drawings.

DETAILED DESCRIPTION OF THE DRAWINGS

A data processor is disclosed herein that implements a particular floating-point format is that defines floating-point values that can represent Floating-Point Numbers (FPNs) and non-floating-point number (NFPNs), such as NaNs and infinity. Floating-point values that represent NaNs can include a NaN indicator, which indicates the value is a NaN, and a NaN source indicator that provides information about the source operands that caused the NaN to be generated. The NaN indicator and NaN source indicator can reside at specific bit locations of a NaN floating-point value. Thus, a floating-point register storing a NaN indicator can also store a NaN source indicator at a NaN data field that provides information as to the cause or source of the NaN resultant. For example, a NaN source indicator can indicate that a NaN resultant was generated based only upon FPN operands, such as when a divide instruction attempts to divide zero by zero. Another NaN source indicator can indicate that the NaN resultant was propagated from a NaN operand (a propagated resultant). According to an embodiment, the NaN source indicator can also indicate the source location from which a propagated NaN operand was retrieved, the instruction operand that was a NaN, the like, and combinations thereof. The term "propagated" as used herein with respect to an instruction generating a NaN resultant is intended to mean that the NaN resultant was generated by virtue of one or more operands of the instruction being a NaN. Various embodiments for implementing floating-point formats in accordance with the present disclosure will be better understood with respect to the figures.

Figure 1:
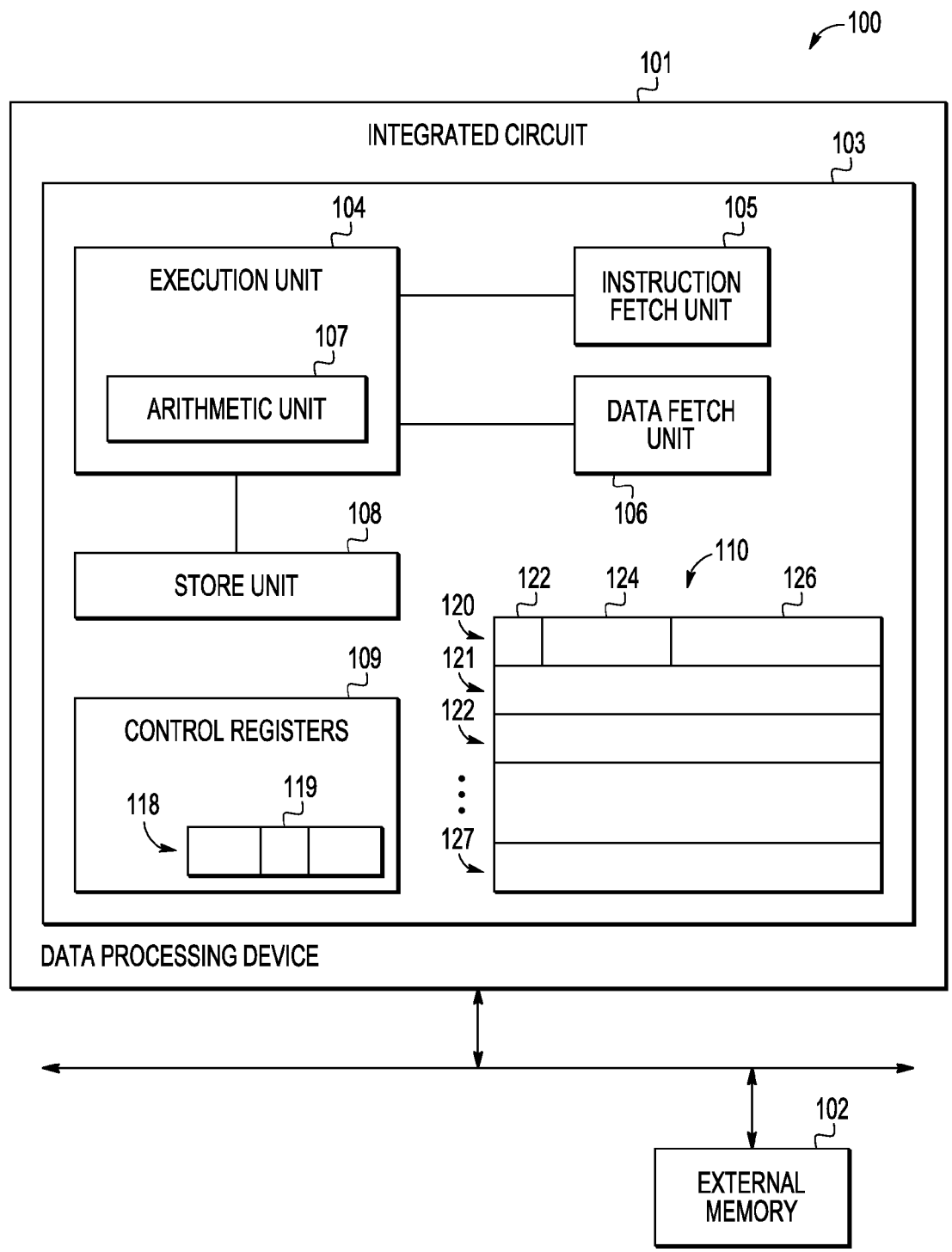
FIG. 1 is a diagram of a data processing device in accordance with at least one embodiment of the present disclosure.

FIG. 1 illustrates a system device (system 100) that can handle floating-point values in accordance with at least one embodiment of the present disclosure. System 100 includes an integrated circuit 101 that can be connected to various external resources, such as external memory 102. Integrated circuit 101 can include an integrated circuit die, a packaged device that can include one or more integrated circuit die, a printed circuit board that can include one or more packaged devices and integrated circuit die, the like, and combinations thereof.

In the depicted example, the integrated circuit 101 includes a data processor device 103, such as a data processor core, that includes an execution unit 104 circuitry, also referred to as execution circuitry and instruction execution circuitry, connected to instruction fetch unit 105 circuitry, to data fetch unit 106 circuitry, to store unit 108 circuitry, to control registers 109 (connection not shown), and to a storage location 110 (connection not shown). The storage location 110 can be a data register set, and is also referred to herein as register file 110. In addition, it will be appreciated that the data processor device 103

During operation, the instruction fetch unit 105 fetches instructions from various memory locations that can include external memory 102, cache (not illustrated), and the like. The fetched instructions are provided to execution unit circuitry 104, which determines the location of operands to be fetched for use by the instruction, and provides the location information to data fetch unit 106. In response, data fetch unit 106 retrieves the requested instruction operands from various source locations that can include one or more of memory 102, a register of register set 110, cache (not illustrated), and the like. During instruction execution, execution unit circuitry 104 can perform an instruction operation, such as an arithmetic operation, using arithmetic unit 107. When an instruction is retired, one or more resultants are provided to store unit 108, which stores information at appropriate destination locations that can include one or more of a memory, a data register set, a cache (not illustrated), and the like.

Execution unit circuitry 104 can be a floating-point processor that processes floating-point instructions having one or more floating-point operands to generate a resultant. For purposes of discussion, it is presumed that each operand of a particular floating-point instruction is stored in a corresponding register. Each register storing an operand for an instruction is identified by information that resides at a distinct location of the instruction, such as at a particular bit position of the instruction's op-code. For example, an opcode of a floating-point instruction having two source operands, such as a divide instruction, can have a opcode field that identifies a general-purpose register where a dividend stored, and a second field that identifies a general-purpose register where the divisor stored. Because the opcode fields have a defined order with respect to each other, one of the fields can be referred to as first in order, while the other field can be referred to as second in order. Unless noted otherwise, it is presumed that instruction operands are stored at one of eight general-purpose register locations of register file 110, represented by reference numerals 120 through 127. In other embodiments, one or more of the registers 120-127 can be special purpose registers, as will be discussed in greater detail herein. In addition, it will be appreciated that the operands can be stored at other locations, such as at general purpose memory locations.

Register 120 of FIG. 1 is register in accordance with a particular floating-point format that defines register fields 122, 124, and 126, which represent a sign field (122), an exponent field (124), and a mantissa field (126). Mantissa field 126 can also be referred to as a significand field. The register can be a general purpose generic register that is available to store either floating-point or non-floating-point values, or a general purpose floating-point register that is dedicated to storing floating-point values. Sign field 122, exponent field 124 and mantissa field 126 each occupy a number of bits defined by the floating-point format. In the present example, the registers in register set 110 are presumed to be 32 bits wide, and the floating-point format specifies a sign field 122 that is one bit wide (bit 32), an exponent field 124 that is eight bits wide (bits 30:23), and a mantissa field 126 that is 23 bits wide (bits 22:0). For ease of discussion, the information stored at the various registers and register fields can be referred to using the same reference numeral as the register or field where the information is stored. For example, as used herein, it would be proper to state that a sign bit 122 having a value of one is stored at sign field 122. Those skilled in the art will appreciate that a variety of floating-point formats are possible and that embodiments of the present disclosure may not depend on the details of a particular implementation. Further, a single data processing device may implement more than one format for floating-point numbers in conjunction with embodiments of the present disclosure.

Figure 2:
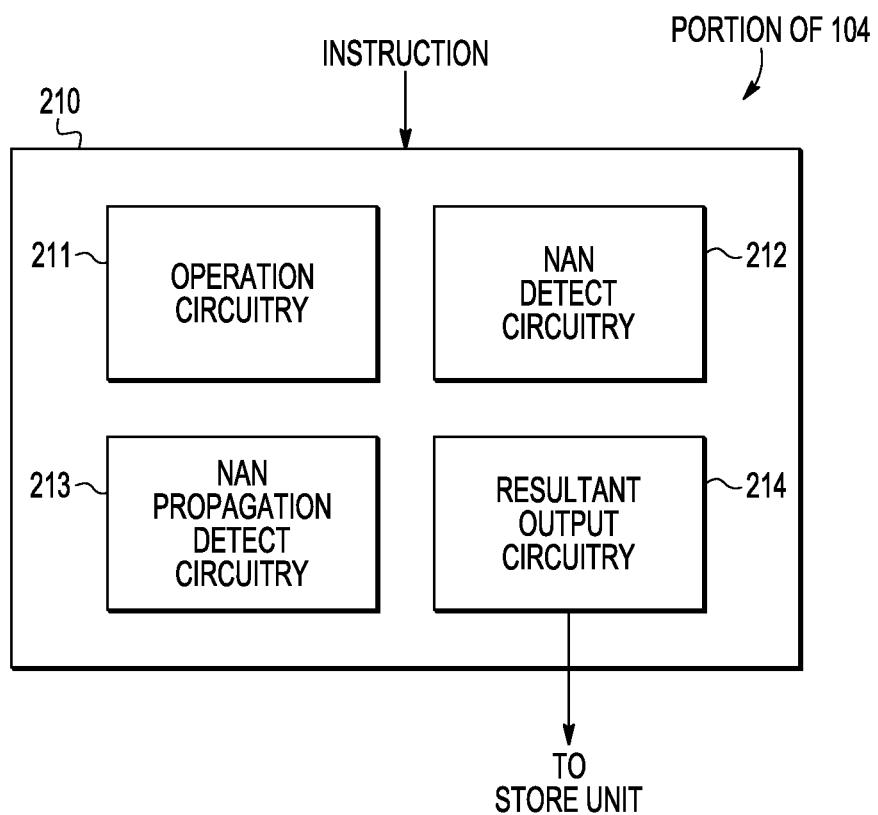
FIG. 2 is a diagram of portion of the data processing device of FIG. 1 in accordance with at least one embodiment of the present disclosure.

FIG. 2 illustrates in greater detail a portion of execution unit circuitry 104 that can be used to execute one or more floating-point instructions. In particular FIG. 2 includes operation circuitry 211, NaN detect circuitry 212, NaN propagation detect circuitry 213, and resultant output circuitry 214.

Operation circuitry 211 includes circuitry used to execute a particular instruction, and therefore determines the result of a particular operation. For example, for a divide instruction the operation circuitry 211 would include circuitry of the arithmetic unit 107 that implements a divide operation. NaN detect circuitry 212 monitors the resultant generated by the operation circuitry 211, to determine if the resultant is a NaN. In response to NaN detect circuitry 212 determining resultant is a NaN, NaN propagation detect circuitry 213 further determines whether the NaN resultant was propagated from an operand. Resultant output circuitry 214 provides a floating-point value resultant to store unit 108 in accordance with the floating-point format. For example, in response to the resultant being a NaN, the resultant output circuitry 214 will provide a NaN value that includes a NaN identifier and one or more NaN source indicators as described in greater detail herein. Specific embodiments of implementing operation circuitry 211, NaN detect circuitry 212, a NaN propagation detect circuitry 213, and resultant output circuitry 214 are also described in greater detail herein.

Figure 3:
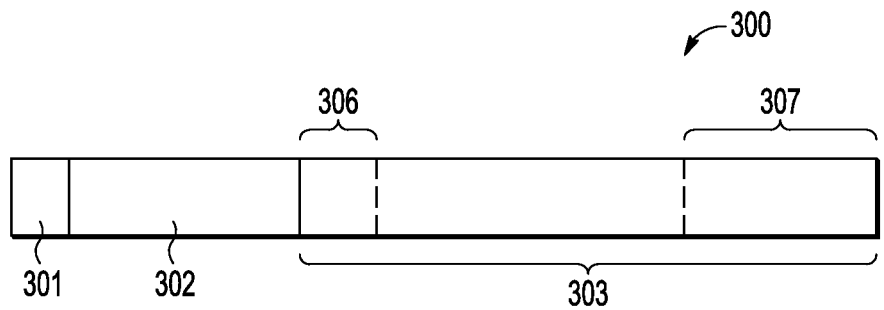
FIG. 3 is a flow diagram illustrating a method for performing an embodiment of the present disclosure.

FIG. 3 illustrates one example of a register partition 300 of a floating-point format that can represent FPNs or NFPNs (Non-Floating-point Numbers). According to the floating-point format, values representing FPNs include a sign bit at a sign field 301 (register bit 31), an exponent at an exponent field 302 (register bits 30:23), and a mantissa at a mantissa field 303 (register bits 22:0). Values representing NFPNs are indicated by the presence of a specific value at a predefined location of the register. For example, a NFPN indicator, presumed to be 11111111b, at the exponent field 302 can indicate that a value is an NFPN, and all other values stored at the exponent field can be referred to as FPN indicators in that they correspond to exponent values of a floating-point number.

When value stored at the exponent field 302 is the NFPN indicator, a portion of the mantissa field 320 is further defined to be a NFPN type field that stores a NFPN type indicator. The NFPN type indicator identifies a specific type of NFPN represented by the floating-point value. It FIG. 3, the NFPN type field is illustrated to be portion 306 (register bits 22:20) of the mantissa field 303.

According to a particular embodiment, a NFPN type indicator of 000b stored in the NaN type field 306 indicates that the NFPN represented by the floating-point value is infinity (e.g., 000b is a NFPN type indicator that corresponds to infinity), a NFPN type indicator of 100b indicates that the NFPN represented by the floating-point number is a NaN of a first type (e.g., 100b is a NFPN type indicator that corresponds to a first NaN type), and a NFPN type indicator of 0nnb stored in NaN type field 306, where nn is a non-zero binary number, indicates that the NFPN is a NaN of a second type. Thus, 001b, 010b, and 011b are NFPN type indicators each of which corresponds to a second NaN type.

One NaN type is referred to herein as a "signaling NaN", which when generated as a resultant is defined to cause an exception. Another NaN type is referred to herein as a "quiet NaN", which when generated as a resultant is not required to cause an exception, e.g., no exception is generated. It will be appreciated, that values stored at the combination of the NFPN indicator and the NFPN type indicator can themselves be indicators of a more specific condition. For example the value 11111111010b at bits 22:31 of a floating-point value can be generically referred to as a NaN indicator, or more specifically as a quiet NaN indicator; the value 11111111100 can also be generically referred to as a NaN indicator, or more specifically as a signaling NaN indicator; the value 11111111000 can be referred to as an infinity indicator.

A NaN value can also include other types of indicators that can store other indicators identifying various other types of conditions. By way of example, the least-significant three bits of the mantissa field, as illustrated at FIG. 3, can be referred to as a NaN data field 307. According to an embodiment, the indicator stored at the NaN data field 307, referred to as a NaN source indicator, indicates whether a NaN resultant was propagated, and if so, the indicator can identify the source register or operand of the instruction from which the propagated NaN was propagated. In other embodiments, source locations other than registers can be identified by the NaN source indicator, such as a memory address or a register where a memory address is stored can be also provided.

The specific type of information to be stored at the NaN data field 307 can be selectable. For example, referring back to FIG. 1, the data processing device 103 can include a control register 118 that includes one or more programmable indicators, such as at a field 119 that can store values used to indicate the type of NaN data field information to be stored. In such an embodiment, an indicator can be stored at field 119 to indicate whether or not a specific type of information is to be stored at a NaN data field 307, e.g., whether or not a particular floating-point format is being extended in a particular manner. For example, an indicator at register 118 can indicate whether or not NaN source information as described herein is to be stored at a NaN data field 307. Another indicator can indicate that NaN source information is to be maintained for certain types of NaNs, e.g., based on the indicator stored at NaN data field 307 the source information described herein is generated only for quiet NaNs, only for signaling NaNs, for all NaNs, for no NaNs, and the like. By way of example, it is presumed herein that all NaN resultants are quiet NaNs, and that generation of the NaN source information is always enabled, e.g., not configurable. It will be appreciated that in other embodiments, the generation of NaN source data can be enabled and disabled by an indicator stored at register 119, and that NaNs other than quiet NaNs can be generated.

Figure 4:
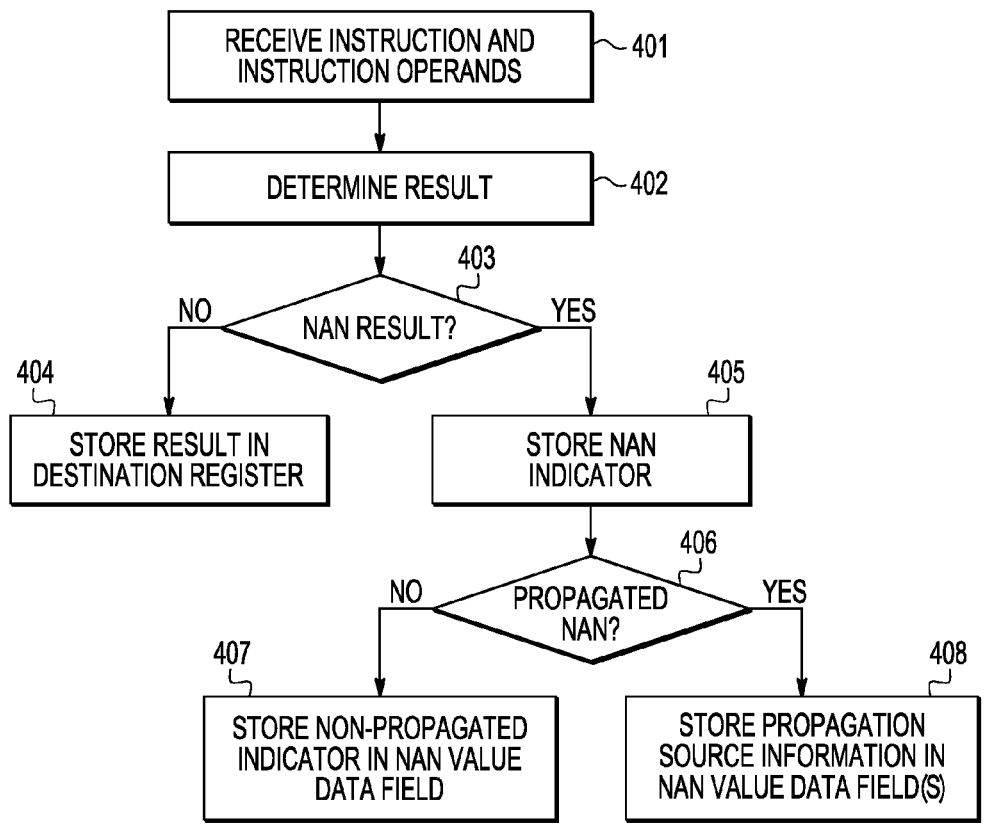
FIG. 4 is a diagram of a generic floating-point register format in accordance with at least one embodiment of the present disclosure.

According to a specific embodiment, a NaN source indicator indicates whether or not a NaN resultant is based upon a propagated NaN operand. If so, the NaN source indicator can further identify the source location from which the NaN was propagated. FIG. 4 illustrates a flow diagram 400 of an embodiment of the present disclosure in which an execution of floating-point instruction results in a floating-point value being stored at a floating-point register. When the floating-point value is a NaN value, the NaN value includes a NaN source indicator that provides source information related to the NaN resultant.

Flow diagram 400 begins with step 401, where a floating-point instruction having one or more floating-point operands has been fetched. The floating-point instruction can be any one of various different types of floating point instructions. However, by way of example, it is presumed that the received instruction is a floating-point divide instruction represented by the opcode mnemonic FDIV dRz sRx sRy, where FDIV indicates that the instruction will perform a divide operation, dRz identifies a destination register where a resultant is to be stored, sRx identifies a source register where the dividend operand is stored; sRy identifies a source register where the divisor operand is stored. It will be appreciated that the mnemonic portion "dR" of the instruction refers to a register that is a destination where a result will be stored, the mnemonic portion "sR" of the instruction refers to a register that is a source where an operand resides, and the mnemonic portions "x", "y", and "z" refer to register identifiers, which in the present example are presumed to be integers 0-7 that correspond to a particular general-purpose register. Thus, by way of example, dR0/sR0 can be a three bit values 000b that corresponds to register 120 (FIG. 1), dR1/sR1 can be a three bit value 001b that corresponds to register 121, and so on.

At step 402, the instruction operands are evaluated to determine a resultant. At block 403, it is determined whether or not the resultant is a NaN. If not, e.g., the resultant is a FPN or other NFPN, flow proceeds to block 404 where an appropriate value, such as a FPN or infinity indicator, is stored at the destination register. If, however, it is determined at step 403 that the resultant is a NaN, flow proceeds to block 405, where an appropriate NaN identifier is stored at the floating-point register to indicate the resultant is a NaN. By way of example, the NaN identifier is the value 11111111b stored at the exponent field 302 and the value 010b is stored at the NaN type field 306 to indicate the resultant is a quiet NaN. Flow proceeds from block 405 to block 406.

At block 406, it is determined whether or not the NaN resultant was generated based upon a NaN operand being propagated. If not, flow proceeds to block 407 and a NaN source indicator is stored at a NaN data field 307 that indicates the NaN resultant was not based upon a propagated source operand, e.g., the NaN resultant was calculated based on FPNs. Otherwise, in response to the NaN resultant being propagated, flow proceeds to block 408, where a NaN source indicator is stored in the NaN data field 307 that provides additional information about the source of the propagated NaN, as will be better understood with reference to the following figures and pseudo code examples.

Figure 5:
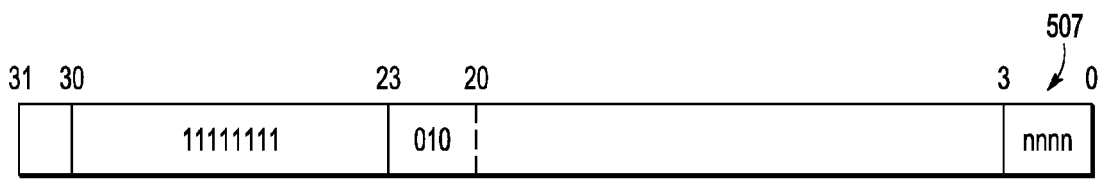
FIG. 5 is a diagram of a specific floating-point register format in accordance with at least one embodiment of the present disclosure.

FIG. 5 illustrates an embodiment of a floating-point format that defines a NaN value that includes a single NaN data field 507 at a predefined location (bits 3:0). The NaN data field can be referred to as a NaN source data field by virtue of the information stored there at being related to the source or cause of a generated NaN resultant. As illustrated, the NaN value includes the NaN indicator 11111111010b, stored at bits 30:20, and a data value nnnnb stored at the NaN data field, wherein nnnnb represents a NaN source indicator that is a four-bit binary number. According to a particular embodiment, the NaN source indicator is selected based on the operands of the instruction that generated the NaN resultant. For example, the selected NaN source indicator can identify whether any of the instruction's operands used to generate the resultant were NaN operands, and if so, from which register was the NaN source operand fetched. A particular embodiment of generating the NaN source indicator will be better understood with reference to PSEUDO CODE LISTING 1.

---

PSEUDO CODE LISTING 1: SINGLE NAN SOURCE DATA FIELD IDENTIFYING SOURCE NAN INFORMATION

```
1  receive instruction INST d_resultant, s_operand1, s_operand1    // Instruction received
2                                                                  // d_resultant, s_operand1, and s_operand2 are register file addresses
3                                                                  // corresponding to registers R0 through R7
4      operand1 = R[s_operand1]                                    // Set variable operand1 to content of corresponding register file register
5      operand2 = R[s_operand2]                                    // Set variable operand2 to content of corresponding register file register
6      fp_value = 0                                                // Set variable to zero that will store floating point value for destination
```

| PSEUDO CODE LISTING 1: SINGLE NAN SOURCE DATA FIELD IDENTIFYING SOURCE NAN INFORMATION | |
|---|---|
| 7   resultant = RESULT OF OPERATION | // Execute instruction operation to determine resultant |
| 8   if resultant == NAN | // Check if resultant is NaN value |
| 9       then | // Resultant was NaN value |
| 10          if ((operand1 <> NAN) AND (operand2 <> NAN) | // Check if there are no NaN operands |
| 11              then | // Neither operand is a NAN |
| 12                  i = 8 | // Set variable for case statement below |
| 13              else | // One or both operands are NANs |
| 14                  if ((operand1 == NAN) AND (operand2 == NAN) | // Check to see all operands are NaN operands |
| 15                      then | // All operands are NANS |
| 16                          i = 9 | // Set variable for case statement below |
| 17                      else | // Exactly one operand is NaN |
| 18                          if operand1 ==NAN | // Check to see if operand 1 is the NaN |
| 19                              then | // operand1 is NAN operand that was propagated |
| 20                                  i = s_operand1 | // Set variable for case statement below |
| 21                              else | // operand2 is NAN operand that was propagated |
| 22                                  i = s_operand2 | // Set j equal to register address/indicator of operand2 |
| 23                          endif | |
| 24                  endif | |
| 25                  fp_value[30:20] = 1111 1111 010b | // Store NAN indicator of FP value at location defined by FP format |
| 26                  case i | // Store NAN source indicator of FP value at location defined by FP format |
| 27                      0: fp_value[3:0] = 0000b | // One NaN operand was received. NAN operand stored a register R0. |
| 28                      1: fp_value[3:0] = 0001b | // One NaN operand was received. NAN operand stored a register R1. |
| 29                      2: fp_value[3:0] = 0010b | // One NaN operand was received. NAN operand stored a register R2. |
| 30                      3: fp_value[3:0] = 0011b | // One NaN operand was received. NAN operand stored a register R3. |
| 31                      4: fp_value[3:0] = 0100b | // One NaN operand was received. NAN operand stored 21a register R4. |
| 32                      5: fp_value[3:0] = 0101b | // One NaN operand was received. NAN operand stored a register R5. |
| 33                      6: fp_value[3:0] = 0110b | // One NaN operand was received. NAN operand stored a register R6. |
| 34                      7: fp_value[3:0] = 0111b | // One NaN operand was received. NAN operand stored a register R7. |
| 35                      8: fp_value[3:0] = 1000b | // Neither operand is NaN. |
| 36                      9: fp_value[3:0] = 1001b | // Both operands are NaNs |
| 37                  end case | |
| 38          endif | |
| 39      else | // Determine non-NaN value to be written to destination register |
| 40          fp_value[30:20] = 1111 1111 010b | // E.g., resultant can be FPN or infinity indicator |
| 41  endif | |
| 42  R[d_resultant] = fp_value | // Set variable to zero that will store floating point value for destination |

PSEUDO CODE LISTING 1 (PCL1) illustrates a particular embodiment of the flow diagram of FIG. 4 for implementing a floating-point format, such as by instruction execution circuitry of the execution unit 104 (FIG. 1), that can generate a floating-point resultant that can be a NaN value having a NaN source indicator. For ease of discussion, the described instruction is a two-operand instruction that generates a single resultant. Furthermore, it is presumed the operands and resultant of the instruction are stored at register file registers, such as register file 110 (FIG. 1). For ease of reference, the specific embodiment of NaN source indicators generated by PCL1 are summarized at TABLE 1.

Each line of a pseudo code listing can be referenced herein using the mnemonic format PCLx_y, where x refers to a specific pseudo code listing, e.g., PCL1, and y refers to a specific line of that listing. For example, line 21 of PSEUDO CODE LISTING 1 can be referenced by the mnemonic PCL1_21.

At PCL1_1 an instruction represented by the mnemonic "INST d_resultant, s_operand1, s_operand1" is received and decoded by the instruction execution circuitry. The instruction provides source information, "s_operand1" and "s_operand2", that identifies the location where two operands are stored, and destination information, "d_resultant", that identifies the location where a resultant is to be stored. By way of example, each of d_resultant, s_operand1, and s_operand2 are presumed to be 3-bit binary values (000b-111b) that correspond to respective register file addresses of general purpose registers R0-R7.

At PCL1_4 and PCL1_5, the first and second instruction operands are loaded to variables operand1 and operand2, respectively, from register locations determined during the instruction decode operation. It will be appreciated that the mnemonic R[s_operand1] refers to the value stored at the register having register file (R) address s_operand1, and the mnemonic R[s_operand2] refers to the value stored at the register having register file (R) address s_operand2. At PCL1_6, a variable is cleared that will store the floating-point value that will be written to the destination register.

At PCL1_7, the execution circuitry determines a resultant of the instruction's operation. For example, if the instruction INST were a divide instruction, a divide operation would be performed to divide the dividend (operand1) by the divisor (operand2) to determine the resultant. The resultant can be a FPN or a NFPN, such as a NaN or infinity.

At PCL1_8, it is determined whether or not the resultant is a NaN, and if so, program flow continues at PCL1_10, where a program flow begins that determines the floating-point value of the resultant, which will be a NaN value stored at the destination register. Otherwise, program flow continues at PCL1_39, where a program flow begins that determines the floating-point value of the resultant, which will be a non-NaN value stored at the destination register.

At PCL1_10 it is determined whether neither instruction operand is a NaN. Flow proceeds to PCL1_12, in response to neither instruction operand being a NaN, where a variable i is set to a value of eight, which will be subsequently used by a case statement that determines the NaN source indicator of the resultant. Otherwise, it is known that there is at least one NaN operand, and flow proceeds to PCL1_14.

At PCL1_14 it is determined if both instruction operands are NaNs, and, in response to both instruction operands being NaNs, flow proceeds to PCL1_16 where the variable i is set to a value of nine. Otherwise, it is known that exactly one of the two operands is a NaN, and flow proceeds to PCL1_18.

At PCL1_18 it is determined if operand1 is the NaN operand, and if so, the variable i is set to the address of operand1 (s_operand1). Otherwise, it is known that operand2 is the NaN operand and variable i is set to the address of operand2 (s_operand2).

At PCL1_25, a NaN indicator, as previously discussed, is written to a defined field of a variable labeled "fp_value", which will ultimately be stored at the destination register. The NaN source indicator of the variable fp_value is determined by the case statement that begins at PCL1_26. In particular, the variable i is used by the case statement to write an appropriate a NaN source indicator to the NaN data field of the variable fp_value. According to the illustrated embodiment, the NaN source indicator indicates whether both instruction operands were NaNs, one instruction operand was a NaN, or neither instruction operand was a NaN. When one of the two instruction operands is a NaN, the NaN source indicator is further selected to identify the location from which the NaN operand was fetched. Note that according to the particular embodiment of PCL1, the NaN source indicator does not indicate which one of the two operands was the NaN operand.

TABLE 1 illustrates the NaN source indicators defined by PCL1. In particular: a NaN source indicator having a value of 0000b-0111b indicates a NaN resultant was propagated by virtue of exactly one of the two instruction operands being a NaN, and the NaN source indicator further identifies the source register that contained the propagated NaN; a NaN source indicator having a value 1000b indicates that a NaN resultant was not propagated from an instruction operand (neither operand was a NaN); a NaN source indicator 1001b indicates that the NaN resultant was generated by virtue of both instruction operands being NaNs (both operands were NaNs).

TABLE 1

SINGLE NaN DATA FIELD IDENTIFYING SOURCE LOCATION

| NaN Source Indicator | Description |
| --- | --- |
| 0000 | Only source register R0 contained NaN |
| 0001 | Only source register R1 contained NaN |
| 0010 | Only source register R2 contained NaN |
| 0011 | Only source register R3 contained NaN |
| 0100 | Only source register R4 contained NaN |
| 0101 | Only source register R5 contained NaN |
| 0110 | Only source register R6 contained NaN |
| 0111 | Only source register R7 contained NaN |
| 1000 | Neither operand is NaN operand |
| 1001 | Both NaN operands received |
| 1010-1111 | Undefined |

It will be appreciated that while a two-operand instruction has been described, for ease of illustration, that other formats can be readily implemented to support instructions with more, or less, than two operands.

Figure 6:
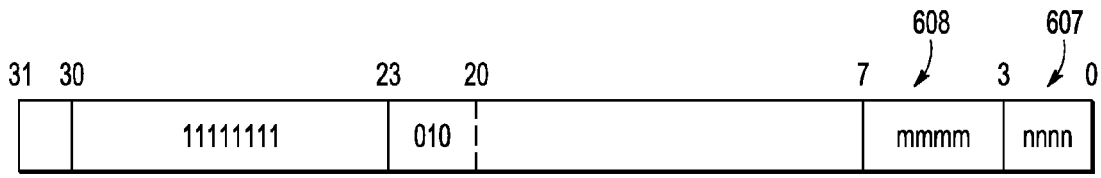
FIG. 6 is a diagram of another a specific floating-point register format in accordance with at least one embodiment of the present disclosure.

FIG. 6 illustrates an alternate embodiment of a floating-point format that defines a NaN value includes multiple NaN data fields 607 and 608. NaN data field 607 includes bits 3:0 of the NaN value, and corresponds to the first operand of a two-operand instruction. NaN data field 608 includes bits 7:4 of the NaN value, and corresponds to the second operand of the two-operand instruction. As illustrated, the NaN value of FIG. 6 includes the quiet NaN indicator 11111111010b stored at bits 30:20, a data value nnnnb stored at the NaN data field 607, wherein nnnnb represents a NaN source indicator that is a four-bit binary number, and a data value mmmmb stored at the NaN data field 608, wherein mmmmb represents a NaN source indicator that is also a four-bit binary number. According to a particular embodiment, the NaN source indicators nnnnb and mmmmb can be indicators having similar values as described with respect to TABLE 1, as will be better understood with reference to PSEUDO CODE LISTING 2 (PCL2).

PSEUDO CODE LISTING 2: MULTIPLE NAN SOURCE DATA FIELDS IDENTIFIERS

```
1    receive instruction INST d_resultant, s_operand1, s_operand1    // Instruction received
2                                                                     // d_resultant, s_operand1, and s_ operand2 are register file addresses
3                                                                     // Corresponding to registers R0 through R7
4    operand1 = R[s_operand1]                                         // Set variable operand1 to content of corresponding register file
5    operand2 = R[s_operand2]                                         // Set variable operand2 to content of corresponding register file
6    fp_value = 0                                                     // Set variable that will store floating point value to zero
7    resultant = RESULT OF OPERATION                                  // Execute instruction operation to determine resultant
8    if resultant == NAN                                              // Check if resultant is NaN value
9        then                                                         // Determine NaN value to be written to destination register
10           if operand1 == NAN                                       // Check to see if operand1 is NaN
11               then                                                 // operand1 is NAN
12                   i = s_operand1                                   // Set variable for case statement below
13               else                                                 // operand1 is non-NAN
14                   i = 8                                            // Set variable for case statement below
15           endif
16           if operand2 == NAN                                       // Check to see if operand2 is NaN
17               then                                                 // operand2 is NAN
18                   j = s_operand2                                   // Set variable for case statement below
19               else                                                 // operand2 is non-NAN
20                   j = 8                                            // Set variable for case statement below
21           endif
22           fp_value[30:20] = 1111 1111 001b                         // Store NAN indicator of FP value at location defined by FP format
23           case i                                                   // Store operand1 information at first NAN data field
24               0: fp_value[3:0] = 0000                              // First operand was NaN stored at register R0.
25               1: fp_value[3:0] = 0001                              // First operand was NaN stored at register R1.
26               2: fp_value[3:0] = 0010                              // First operand was NaN stored at register R2.
27               3: fp_value[3:0] = 0011                              // First operand was NaN stored at register R3.
28               4: fp_value[3:0] = 0100                              // First operand was NaN stored at register R4.
29               5: fp_value[3:0] = 0101                              // First operand was NaN stored at register R5.
30               6: fp_value[3:0] = 0110                              // First operand was NaN stored at register R6.
31               7: fp_value[3:0] = 0111                              // First operand was NaN stored at register R7.
```

| PSEUDO CODE LISTING 2: MULTIPLE NAN SOURCE DATA FIELDS IDENTIFIERS | | |
|---|---|---|
| 32 | 8: fp_value[3:0] = 1000 | // First operand was non-NaN. |
| 33 | endcase | |
| 34 | case j | // Store operand2 information at second NAN data field |
| 35 | 0: fp_value[7:4] = 0000 | // Second operand was NaN stored at register R0. |
| 36 | 1: fp_value[7:4] = 0001 | // Second operand was NaN stored at register R1. |
| 37 | 2: fp_value[7:4] = 0010 | // Second operand was NaN stored at register R2. |
| 38 | 3: fp_value[7:4] = 0011 | // Second operand was NaN stored at register R3. |
| 39 | 4: fp_value[7:4] = 0100 | // Second operand was NaN stored at register R4. |
| 40 | 5: fp_value[7:4] = 0101 | // Second operand was NaN stored at register R5. |
| 41 | 6: fp_value[7:4] = 0110 | // Second operand was NaN stored at register R6. |
| 42 | 7: fp_value[7:4] = 0111 | // Second operand was NaN stored at register R7. |
| 43 | 8: fp_value[7:4] = 1000 | // Second operand was non-NaN. |
| 44 | endcase | |
| 45 | else | // determine non-NaN value to be written to destination register |
| 46 | fp_value[31:0] = resultant | // e.g., resultant can be FPN or infinity indicator |
| 47 | endif | |
| 48 | R[d_resultant] = fp_value | // Store resultant to destination register of instruction |

PCL2 illustrates a particular embodiment of the flow diagram of FIG. 4 for implementing a floating-point format, by instruction execution circuitry of a data processor, that generates a floating-point resultant having multiple NaN source indicators. In particular, the example of PCL2 has a corresponding source indicator for each source operand of the instruction. The instruction of PCL2 is presumed to be a two-operand instruction, and unless explicitly indicated otherwise, the nomenclature of PCL1 applies to PCL2. In response to an instruction generating a NaN, the floating-point format of PCL2 specifies that one of a plurality of possible NaN source indicators will be stored at each of the two NaN data fields.

At PCL2_1 an instruction is received and decoded by the instruction execution circuitry as described with reference to PCL1. At PCL2_4 and PCL2_5, the first and second instruction operands are loaded to variables operand1 and operand2 as previously described with reference to PCL2. At PCL1_6, a variable fp_value is cleared that will store the floating-point value that will be written to the destination register.

At PCL2_7, the instruction execution circuitry determines a resultant of the instruction's operation. For example, if the instruction INST were a divide instruction, a divide operation would be performed to divide the dividend (operand1) by the divisor (operand2) to determine the resultant, which can be a FPN or NFPN.

At PCL2_8, it is determined whether or not the resultant is a NaN, and if the resultant is a NaN program flow continues at PCL2_10, where a program flow begins that determines the floating-point value of the resultant, which will be a NaN value. Otherwise, program flow continues at PCL2_45, where a program flow begins that determines a non-NaN floating-point value that will be stored at the destination register.

At PCL2_10 it is determined whether operand1 is a NaN. If so, the variable i, which corresponds to the first operand, is set at PCL2_12 to an indicator that identifies the address where operand1 is stored. For example, the indicator can be the file register address of operand1. Otherwise, the variable i is set at PCL2_14 to the value 8 to indicate the first operand is a non-NaN value. Flow continues at PCL2_16 where it is determined whether operand2 is a NaN. If so, the variable j, which corresponds to the second operand, is set at PCL2_18 to the address of operand2 where the second operand is stored. Otherwise, the variable j is set at PCL2_20 to the value eight to indicate the second operand is a non-NaN value.

At PCL2_22, a NaN indicator, as previously discussed, is written to a defined field of variable fp_value, which will ultimately be stored at the destination register. The NaN source indicators of the variable fp_value are determined by the case statements that begin at PCL2_23 and PCL2_34. The case statement at PCL2_23 writes a NaN source indicator to the first NaN data field of the variable fp_value. According to the illustrated embodiment, the NaN source indicator indicates whether the first instruction operand was a NaN or a non-NaN. In response to the first operand being a non-NaN, the NaN source indicator 1000b is stored at the first NaN data field. In response to the first operand being a NaN, a NaN source indicator in the range of 0000b-0111b is stored at the first NaN data field, wherein the selected value further indicates the register from which the first operand was fetched. Similarly, the case statement at PCL2_34 writes a NaN source indicator to the second NaN data field of the variable fp_value. According to the illustrated embodiment, the NaN source indicator indicates whether the second instruction operand was a NaN or a non-NaN. In response to the second operand being a non-NaN, the NaN source indicator 1000b is stored at the second NaN data field. Furthermore, in response to the second operand being a NaN, a NaN source indicator in the range of 0000b-0111b is stored at the second NaN data field, wherein the selected NaN source indicator further indicates the register from which the second operand was fetched.

TABLE 2 illustrates the NaN source indicators implemented by PCL2. In particular: a NaN source indicator having a value of 0000b-0111b at a data field indicates that the operand corresponding to the data field was a NaN, and further identifies the source register from which the corresponding NaN operand was fetched. A NaN source indicator 1000b when stored at a NaN data field indicates that the operand corresponding to that NaN data field was a non-NaN value.

TABLE 2

MULTIPLE NaN DATA FIELDS IDENTIFYING REGISTERS

| NaN Source Indicator | Description |
|---|---|
| 0000 | Operand is NaN at register R0 |
| 0001 | Operand is NaN at register R1 |
| 0010 | Operand is NaN at register R2 |
| 0011 | Operand is NaN at register R3 |
| 0100 | Operand is NaN at register R4 |

TABLE 2-continued

MULTIPLE NaN DATA FIELDS IDENTIFYING REGISTERS

| NaN Source Indicator | Description |
| --- | --- |
| 0101 | Operand is NaN at register R5 |
| 0110 | Operand is NaN at register R6 |
| 0111 | Operand is NaN at register R7 |
| 1000 | Operand is non-NaN |
| 1001-1111 | Undefined |

Pseudo Code Listing 3 PCL3 illustrates a particular embodiment of the flow diagram of FIG. 4 for implementing a floating-point format, by instruction execution circuitry of a data processor, that defines use of a NaN data field that is bit-mapped to the source operands of the instruction. For example, referring to the register of FIG. 5, each bit of the register bits 3:0 can be mapped to a corresponding operand of an instruction—up to four operands. In particular, during instruction execution, in response to a resultant being a NaN, each bit of the NaN source indicator that corresponds to a respective instruction operand will be asserted, e.g., set to a predefined binary value, such as a binary one, if its corresponding operand is a NaN. Otherwise, each bit of the NaN source indicator will be negated if its corresponding operand is not a NaN.

At PCL3_9, it is determined whether or not the resultant is a NaN, and if so, program flow continues at PCL3_10, otherwise flow proceeds at PCL3_24.

Beginning at PCL3_11, in response to the resultant being a NaN, the first operand is evaluated. If it is determined that the first operand is a NaN, the bit location of variable fp_value that is mapped to the first operand is asserted at PCL3_13. Thus bit fp_value[0] is set to a one. If it is determined that the first operand is not a NaN, the bit location of variable fp_value that is mapped to the first operand is negated at PCL3_15. Thus bit fp_value[b0] is set to a binary zero. Continuing at PCL3_17, the second operand is evaluated. If it is determined that the second operand is a NaN, the bit location of variable fp_value that is mapped to the second operand is asserted at PCL3_19. Thus bit fp_value[1] is set to a binary one. If it is determined that the second operand is not a NaN, the bit location of variable fp_value that is mapped to the second operand is negated at PCL3_21. Thus bit fp_value[1] is set to a binary zero.

The NaN configuration routine continues at PCL3_25 where the NaN indicator is written to a defined location of the variable fp_value, as previously described.

At PCL3_25, in response to the resultant not being a NaN (see PCL3_9), the resultant determined by the instruction operation is stored in the variable fp_value.

At PCL3_27, the destination register is set to the floating-point value stored in the variable fp_value.

PSEUDO CODE LISTING 3: BIT-MAPPED NAN DATA FIELD

| | | |
| --- | --- | --- |
| 1 | receive instruction INST d_resultant, s_operand1, s_operand1 | // Instruction received. |
| 2 | | // d_resultant, s_operand1, and s_ operand2 are register file addresses |
| 3 | | // corresponding to registers R0 through R7 |
| 4 | operand1 = R[s_operand1] | //Set variable operand1 to content of corresponding register file register |
| 5 | operand2 = R[s_operand2] | //Set variable operand2 to content of corresponding register file register |
| 6 | | |
| 7 | resultant = RESULT OF OPERATION | // Execute instruction operation to determine resultant |
| 8 | fp_value = 0 | |
| 9 | if resultant == NAN | // Execute instruction operation to determine resultant |
| 10 | then | // Determine NaN value to be written to destination register |
| 11 |     if operand1 == NAN | // Check to see if operand1 is NaN |
| 12 |     then | // operand1 is NAN |
| 13 |         fp_value[0] = 1 | // Assert bit mapped to first operand (bit 0) |
| 14 |     else | // operand1 is non-NAN |
| 15 |         fp_value[0] = 0 | // Negate bit mapped to first operand (bit 0) |
| 16 |     endif | |
| 17 |     if operand2 == NAN | // Check to see if operand2 is NaN |
| 18 |     then | // operand2 is NAN |
| 19 |         fp_value[1] = 1 | // Assert bit mapped to second operand (bit 1) |
| 20 |     else | // operand1 is non-NAN |
| 21 |         fp_value[1] = 0 | // Negate bit mapped to second operand (bit 1) |
| 22 |     endif | |
| 23 |     fp_value[30:20] = 1111 1111 001b | // Store NAN indicator of FP value at location defined by FP format |
| 24 | else | // determine non-NaN value to be written to destination register |
| 25 |     fp_value[31:0] = resultant | // e.g., resultant can be FPN or infinity indicator |
| 26 | endif | |
| 27 | R[d_resultant] = fp_value | // Store resultant to destination register of instruction |

The instruction of PCL3 is presumed to be a two-operand instruction, and unless explicitly indicated otherwise, the nomenclature of PCL2 applies to PCL3. At PCL3_1 an instruction is received by the instruction execution circuitry as described with reference to PCL2. At PCL3_4 and PCL3_5, the first and second instruction operands are loaded to variables operand1 and operand2 as previously described with reference to PCL2.

At PCL3_7, the instruction execution circuitry determines a resultant of the instruction's operation. At PCL3_8, a variable fp_value, which will ultimately be written to the destination register, is initialized to zero.

Table 3 illustrates the NaN source indicators used by PCL3. For example, a NaN source indicator value 0000b indicates that none of the instruction operands used to generate the NaN resultant were NaNs. A NaN source indicator value 0001b indicates that the first operand of the instruction was a NaN. NaN source indicator value 0010b indicates that the second operand of the instruction was a NaN. NaN source indicator value 0011b indicates that both the first and second operands of the instruction were NaNs. It will be appreciated, that the NaN source indicator values 0100b-1111b are not used by the two operand instruction implemented at PCL3, but would have a meaning with respect to instructions having three or four operands. For example, with respect to a four operand instruction, a NaN source value of 0101b indicates that operands two and four were not NaNs, operand one and three were NaNs.

TABLE 3

SINGLE NaN DATA FIELD WITH BIT-MAPPED VALUES

| NaN Source Indicator | Description |
| --- | --- |
| 0000 | No NaN operands |
| 0001 | The operand mapped to bit 1 is a NaN |
| 0010 | The operand mapped to bit 2 is a NaN |
| 0011 | The operands mapped to bits 1 and 2 are NaNs |
| 0100 | The operand mapped to bit 3 is a NaN |
| 0101 | The operands mapped to bits 1 and 3 are NaNs |

TABLE 3-continued

SINGLE NaN DATA FIELD WITH BIT-MAPPED VALUES

| NaN Source Indicator | Description |
| --- | --- |
| 0110 | The operands mapped to bits 2 and 3 are NaNs |
| 0111 | The operands mapped to bits 1, 2 and 3 are NaNs |
| 1000 | The operand mapped to bit 4 is a NaN |
| 1001--1111 | Each set bit has corresponding NaN operand |

The bit-map concept of PCL3 can be extended to the use of stacks, wherein each instruction operand is mapped to a NaN data field having a plurality of bits, as will be better understood with reference to Pseudo Code Listing 4 (PCL4).

PSEUDO CODE LISTING 4: STACK BASED NAN DATA FIELDS

```
1   receive instruction INST d_resultant, s_operand1, s_operand1    // Instruction received
2                                                                    // d_resultant, s_operand1, and s_ operand2 are register file addresses
3                                                                    // corresponding to registers R0 through R7
4   operand1 = R[s_operand1]                                         // Set variable operand1 to content of corresponding register file register
5   operand2 = R[s_operand2]                                         // Set variable operand2 to content of corresponding register file register
6
7   resultant = RESULT OF OPERATION                                  // Execute instruction operation to determine resultant
8   fp_value = 0                                                     // Set variable to zero that will store floating point value for destination
9   if resultant == NAN                                              // Execute instruction operation to determine resultant
10      then                                                         // Determine NaN value to be written to destination register
11          if ((operand1 <> NAN) AND (operand2 <> NAN)              // Check to see if neither operand is NAN
12              then
13                  i = 0                                            // Neither operand is NAN
14          endif
15          if ((operand1 == NAN) AND (operand2 <> NAN)              // Check to see if first operand only is NAN
16              then
17                  i = 1                                            // First operand only is NAN
18          endif
19          if ((operand1 <> NAN) AND (operand2 == NAN)              // Check to see if second operand only is NAN
20              then
21                  i = 2                                            // Second operand only is NAN
22          endif
23          if ((operand1 == NAN) AND (operand2 == NAN)              // Check to see if both operands are NaNs
24              then
25                  i = 3                                            // Both operands are NaNs
26          endif
27          fp_value[30:20] = 1111 1111 010b                         // Store NAN indicator of FP value at location defined by FP format
28          case i                                                   // Determine and store stack information at both NaN fields
29              0:                                                   // No NaN operands. FP resultant not propagated
30                  fp_value[7:0] = 0b                               // Create/initialize first NaN stack
31                  fp_value[15:8] = 0b                              // Create/initialize first NaN stack
32              1:                                                   // First operand is NaN & second operand is Non_NAN
33                  fp_value[7:1] = operand1[6:0]                    // Shift first NaN stack left
34                  fp_value[0] = 1                                  // Assert LSB of first NaN stack
35                  fp_value[15:9] = operand1[14:8]                  // Shift second NaN stack left
36                  fp_value[8] = 0                                  // Negate LSB of first NaN stack
37              2:                                                   // Second operand is NaN & first operand is Non_NAN
38                  fp_value[7:1] = operand1[6:0]                    // Shift second NaN stack left
39                  fp_value[0] = 0                                  // Negate LSB of first NaN stack
40                  fp_value[15:9] = operand1[14:8]                  // Shift second NaN stack left
41                  fp_value[8] = 1                                  // Assert LSB of second NaN stack
42              3:                                                   // Second operand is NaN & first operand is NAN
43                  fp_value[7:0] = operand2[7:0] | operand1 [7:0]   // Or together first stack of both NAN operands
44                  fp_value[15:8] = operand2[15:8] | operand1[15:8] // Or together second stack of both NAN operands
45                  fp_value[7:1] = operand1[6:0]                    // Shift first NaN stack left
46                  fp_value[0] = 1                                  // Assert LSB of first NaN stack
47                  fp_value[15:9] = operand1 [14:8]                 // Shift second NaN stack left
48                  fp_value[8] = 1                                  // Assert LSB of first NaN stack
49          endcase
50      else                                                         // determine non-NaN value to be written to destination register
51          fp_value[31:0] = resultant                               // e.g., resultant can be FPN or infinity indicator
52  endif
53  R[d_resultant] = fp_value                                        // Store resultant to destination register of instruction
```

PCL4 illustrates a particular embodiment of the flow diagram of FIG. 4 for implementing a floating-point format that defines maintaining stacks at each of a plurality of NaN data fields, wherein each stack is bit-mapped to a correspond source operand of the instruction. For example, referring to the register of FIG. 5, each bit of the field 607 (bits 3:0) can be mapped to a first operand of an instruction, and each bit of the field 608 can be mapped to the second operand of the instruction. By way of example, the NaN data fields described at PCL4 are each presumed to have eight bits, as opposed to the four-bit fields illustrated at FIG. 5. Thus, a first stack is at bits 7:0, and a second stack is at bits 15:8.

At PCL4__1 an instruction is received by the execution unit circuitry as described with reference to PCL2. At PCL4__4 and PCL3__5, the first and second instruction operands are loaded to variables operand1 and operand2 as previously described. At PCL4__7 the instruction execution circuitry determines a resultant of the instruction's operation. At PCL4__8, a variable fp_value, which will ultimately be written to the destination register, is initialized to zero.

At PCL4__9, it is determined whether or not the resultant is a NaN, and if so, program flow continues at PCL4__10, otherwise flow proceeds at PCL4__50.

Beginning at PCL4__11 and ending at PCL4__26, it is determined which, if any, of the operands are NaNs, and a variable i is set accordingly. Once determined, the NaN configuration routine continues at PCL4__27 where the NaN indicator is written to a defined location of the variable fp_value, as previously described.

The case statement beginning at PCL4__28 determines the stack values at each of the two NaN data fields. In response to neither instruction operand being a NaN (Case condition zero (0) at PCL4__29), the stacks are cleared at lines PCL4__30 and PCL__31. Thus, a stack value of 00000000b at bits 7:0 of the NaN value indicates that the first operand of the instruction was not a NaN, a stack value of 00000000b at bits 15:8 of the NaN value indicates that the second operand of the instruction was not a NaN, and the combination of these two stacks indicates that the NaN resultant was not propagated.

In response to the first instruction operand being a NaN and the second instruction operand being a non-NaN (Case condition one (1) at PCL4__32), it will be appreciated that the first operand will have its own NaN source information comprising two stacks, by virtue of the first operand being a NaN. In response, the two stacks of the first operand are effectively left-shifted by one bit at PCL4__33 and PCL4__35 (with the LSB being sticky, e.g., maintained at bit 0). According to a specific embodiment, the leading bit information is not maintained, and therefore is lost. In response to the first instruction operand being a NaN, the LSB location of the first stack is asserted. Also, in response to the second instruction not being a NaN, the LSB location of the second stack is negated to indicate the second operand was a non-NaN value.

In response to the first instruction operand being a non-NaN and the second instruction operand being a NaN (Case condition two (2) at PCL4__37), it will be appreciated that the second operand will have its own NaN source information comprising two stacks, by virtue of the second operand being a NaN. In response, the two stacks of the second operand are effectively left-shifted by one bit at PCL4__38 and PCL4__40. Because the second instruction operand was a NaN, the LSB location of the second stack is asserted. Also, the LSB location of the first stack is negated to indicate the second operand was a non-NaN value.

In response to both the first and second instruction operands being NaNs (Case condition three (3) at PCL4__42), it will be appreciated that both the first and second operands will have their own NaN source information comprising two stacks. A logical operation, illustrated as an OR operation, is performed based upon the available stack information. For example, the first stack of the first operand and the first stack of the second operand can be ORed together as illustrated at PCL4__43; and the second stack of the first operand and the second stack of the second operand can be ORed together as illustrated at PCL4__44. At PCL4__45 and PCL4__47, the merged stacks are each shifted as previously described at PCL4__45 and PCL4__47. Because the first and second instruction operands were both NaNs, the LSB location of both the first and second stacks is asserted at PCL4__46 and PCL4__48.

It will be appreciated that other embodiments of generating the first and second stack can be used when both operands are NaNs. For example, a specified one of the two operands can be used to generate both of the resultant's stacks. One stack from one instruction operand can be used to generate the first stack of the resultant, and one stack from a different instruction operand can be used to generate the second stack of the resultant. The specific manner in which the resultant's stacks are generated can be fixed, or programmable. For example, a user could store a value in a control register to select amongst more than one stack generation option when both operands are NaNs.

The specification and drawings should be considered exemplary only, and the scope of the disclosure is accordingly intended to be limited only by the following claims and equivalents thereof. Other embodiments, uses, and advantages of the disclosure will be apparent to those skilled in the art from consideration of the specification and practice of the disclosure disclosed herein. For example, it will be appreciated that register bits not specifically designated by one floating-point format as part of a particular field can be used by an extension of that floating-point format to communicate other information. For example, the locations where the NaN data fields 307 reside can be used to implement an extension of a floating-point format that does not explicitly define, or need to use, those bits, and therefore the NaN data fields 307 can communicate user specified information. The specific sizes and values of bit fields as used herein are used for purposes of discussion, and, therefore, other field sizes and values may be used in embodiments of the present disclosure.

In another embodiment, encoding values other than those illustrated in the various tables described above can be implemented. For example, TABLE 4 illustrates encoding values that can be used with another implementation of a floating-point format similar to that described with respect to PCL1. In particular the encoding values of TABLE 4 can be used with a data processor having eight registers, two of which are special purpose registers and six of which are general purpose registers. A special purpose register refers to a register that either cannot be the source of a floating-point instruction operand, or that is unlikely to be the source of a floating-point operand. For example, it is presumed that an instruction set architecture has the following eight registers at address locations 000b—111: six general purpose registers (GPR0-GPR6) that are accessed from a register file using register file addresses (010b-111b); a register at register file address 000b that is dedicated to storing a program counter; and a register at register file address 001b that is dedicated to store a system stack pointer. Because the register addresses of special purpose registers have no contextual meaning with respect to instruction operands, or are highly unlikely to have contextual meaning, their addresses can be reused in the context of the NaN data field. Thus, as indicated at TABLE 4, the values 000b and 001b can be used to reduce the size of the NaN source data field from four bits (see TABLE 1) to three bits. Thus, pseudo code similar to PCL1 can store the NaN source indicators of TABLE 4 in response to the conditions as identified at TABLE 4. It will be appreciated that other special purpose registers can exist, such as: a stack offset register; registers storing intermediate pipeline values; and the like.

TABLE 4

SINGLE NaN DATA FIELD VALUES IDENTIFYING REGISTERS (WITH REUSE OF SPECIAL PURPOSE REGISTER ADDRESSES)

| NaN Source Indicator | Description |
| --- | --- |
| 000 | Neither NaN operand is NaN |
| 001 | Both NaN operands are NaNs |
| 010 | Source register R0 contained NaN |
| 011 | Source register R1 contained NaN |
| 100 | Source register R2 contained NaN |
| 101 | Source register R3 contained NaN |
| 110 | Source register R4 contained NaN |
| 111 | Source register R5 contained NaN |

It will be appreciated that various circuitry herein has been described from an operational perspective, including the various pseudo code description. For example, operation circuitry 211, non-FPN detect circuitry 212, a NaN propagation detect circuitry 213, and resultant output circuitry 214 of FIG. 2 are represented by the various pseudo code provided herein. It will be further appreciated that actual circuitry is typically generated based upon code analogous to the provided pseudo code, such as Verilog code. For example, program code is typically provided to a logic synthesis tool that generates logic circuitry that realizes the design put forth in the code. This logic circuitry is further converted to nominal components, such as transistors, which are subjected to layout tools that generate design files of various types that are then used to manufacture integrated circuit devices that include final circuitry that implements the operations described by the pseudo code.

In a first aspect, a method can include receiving a first instruction having a plurality of operands at an execution unit circuitry of a data processor, and in response to execution of the first instruction at the execution unit circuitry, generating a propagated first NaN resultant for the first instruction, the first NaN resultant can include a first NaN source indicator that indicates the resultant is a propagated NaN.

In one embodiment of the first aspect, the first NaN source indicator is located at a predefined location of the first NaN resultant. In another embodiment of the first aspect, the first NaN source indicator further identifies a source location of a source operand. In a particular embodiment, the source location is a general purpose register.

In a further embodiment of the first aspect, the first NaN source indicator further identifies which operands of the plurality of operands were NaNs. In yet another embodiment of the first aspect, the first NaN source indicator includes a plurality of mapped bits including a first mapped bit and a second mapped bit, a first operand of the first instruction mapped to the first mapped bit of the plurality of mapped bits, a second operand of the first instruction mapped to the second mapped bit of the plurality of mapped bits. The method further includes asserting each mapped bit of the plurality of mapped bits in response to its respective operand being a NaN.

In yet a further embodiment of the first aspect, the method includes receiving a second instruction having a plurality of operands at the execution unit circuitry, and in response to execution of the second instruction at the execution unit circuitry, generating a non-propagated second NaN resultant for the second instruction, the second NaN resultant includes a second NaN source indicator that indicates the NaN resultant was not propagated. In still another embodiment of the first aspect, the first NaN source indicator includes a plurality of bits corresponds to a first operand of the instruction, and, in response to the first operand being a NaN, the first NaN source indicator indicates that the first operand is the NaN; the first NaN resultant further includes a second NaN source indicator that includes a plurality of bits, and that corresponds to a second operand of the instruction, and, in response to the second operand being a NaN, the second NaN source indicator indicates that the second operand is the NaN. In a particular embodiment, the first NaN source indicator further identifies a source location of the first operand in response to the first being a NaN.

In still a further embodiment of the first aspect, the first NaN source indicator corresponds to a first operand of the instruction, and, in response to the first operand being a NaN, the first NaN source indicator indicates that the first operand is a NaN and indicates a source location of the first operand; the first NaN resultant further comprises a second NaN source indicator that corresponds to a second operand of the instruction, and, in response to the second operand being a non-NaN, the second NaN source indicator indicates that the second operand is a non-NaN.

In an even further embodiment of the first aspect, the first NaN source indicator corresponds to a first operand of the instruction, and, in response to the first operand being a non-NaN, the first NaN source indicator indicates that the first operand is a non-NaN; the first NaN resultant further comprises a second NaN source indicator that corresponds to a second operand of the instruction, and, in response to the second operand being a non-NaN, the second NaN source indicator indicates that the second operand is a non-NaN. In another even further embodiment, the method includes receiving a second instruction having a plurality of operands at the execution unit circuitry, and in response to execution of the second instruction at the execution unit circuitry, generating a propagated second NaN resultant for the second instruction, the second NaN resultant comprising a second NaN source indicator that indicates the resultant is not a propagated NaN.

In a second aspect, a processing device can include instruction fetch circuitry of a data processor core to fetch a floating-point instruction having a plurality of operands, and execution unit circuitry of the data processor core to execute the instruction to determine a resultant, in response to the resultant being a NaN resultant, the execution unit circuitry to determine whether the NaN resultant was propagated from an operand, and, in response to determining that the NaN resultant was propagated from the operand, the execution unit circuitry is to store a first NaN source indicator that indicates the NaN resultant is a propagated NaN.

In one embodiment of the second aspect, the first NaN source indicator is stored at a predetermined location of the NaN resultant. In another embodiment of the second aspect, the first NaN source indicator further identifies a source location of an operand of the plurality of operands that was propagated. In a particular embodiment, each one of the plurality of operands is stored at a respective register that is identified by the instruction.

In a further embodiment of the second aspect, the first NaN source indicator further identifies an operand of the plurality of operands that is a NaN operand. In yet another embodiment of the second aspect, the NaN source indicator includes a plurality of mapped bits, each bit of the plurality of mapped bits mapped to a corresponding operand of the instruction, wherein the execution unit circuitry is to assert each bit of the plurality of mapped bits that is mapped to a NaN operand. In yet a further embodiment of the second aspect, in response to the execution unit circuitry determining that the NaN resultant is not propagated, the execution unit circuitry is to store a second NaN source indicator that indicates the NaN resultant was not propagated.

In a third aspect, a method can include receiving a first instruction having a plurality of operands at execution unit circuitry of a data processor, fetching a NaN operand comprising a first NaN source indicator having a plurality of mapped bits, and a second NaN source indicator having a plurality of mapped bits, and generating a propagated NaN resultant comprising a third NaN source indicator having a plurality of bits, and a fourth NaN source indicator having a plurality of bits, wherein a portion of the third NaN source indicator is based upon a portion of the first NaN source indicator, and a portion of the fourth NaN source indicator is based upon a portion of the second NaN source indicator.

The specification and drawings should be considered exemplary only, and the scope of the disclosure is accordingly intended to be limited only by the following claims and equivalents thereof. Other embodiments, uses, and advantages of the disclosure will be apparent to those skilled in the art from consideration of the specification and practice of the disclosure disclosed herein. For example, the specific example described above has been with respect to a NaN of type qNaN, though it will be appreciated that in other embodiments, the techniques described herein can apply to generation of other types of NaNs as well.

What is claimed is:

1. A method comprising:
   receiving a first instruction having a plurality of operands at an execution unit circuitry of a data processor; and
   in response to execution of the first instruction at the execution unit circuitry, generating a propagated first NaN resultant for the first instruction, the first NaN resultant comprising a first NaN source indicator that indicates the resultant is a propagated NaN.

2. The method of claim 1, wherein the first NaN source indicator is located at a predefined location of the first NaN resultant.

3. The method of claim 1, wherein the first NaN source indicator further identifies a source location of a source operand.

4. The method of claim 3, wherein the source location is a general purpose register.

5. The method of claim 1, wherein the first NaN source indicator further identifies which operands of the plurality of operands were NaNs.

6. The method of claim 1, wherein the first NaN source indicator includes a plurality of mapped bits including a first mapped bit and a second mapped bit, a first operand of the first instruction mapped to the first mapped bit of the plurality of mapped bits, a second operand of the first instruction mapped to the second mapped bit of the plurality of mapped bits; the method further comprising:
   asserting each mapped bit of the plurality of mapped bits in response to its respective operand being a NaN.

7. The method of claim 1, further comprising:
   receiving a second instruction having a plurality of operands at the execution unit circuitry; and
   in response to execution of the second instruction at the execution unit circuitry, generating a non-propagated second NaN resultant for the second instruction, the second NaN resultant comprising a second NaN source indicator that indicates the NaN resultant was not propagated.

8. The method of claim 1, wherein the first NaN source indicator comprises a plurality of bits corresponds to a first operand of the instruction, and, in response to the first operand being a NaN, the first NaN source indicator indicates that the first operand is the NaN; the first NaN resultant further comprises a second NaN source indicator that comprises a plurality of bits, and that corresponds to a second operand of the instruction, and, in response to the second operand being a NaN, the second NaN source indicator indicates that the second operand is the NaN.

9. The method of claim 8, wherein the first NaN source indicator further identifies a source location of the first operand in response to the first being a NaN.

10. The method of claim 1, wherein the first NaN source indicator corresponds to a first operand of the instruction, and, in response to the first operand being a NaN, the first NaN source indicator indicates that the first operand is a NaN and indicates a source location of the first operand; the first NaN resultant further comprises a second NaN source indicator that corresponds to a second operand of the instruction, and, in response to the second operand being a non-NaN, the second NaN source indicator indicates that the second operand is a non-NaN.

11. The method of claim 1, wherein the first NaN source indicator corresponds to a first operand of the instruction, and, in response to the first operand being a non-NaN, the first NaN source indicator indicates that the first operand is a non-NaN; the first NaN resultant further comprises a second NaN source indicator that corresponds to a second operand of the instruction, and, in response to the second operand being a non-NaN, the second NaN source indicator indicates that the second operand is a non-NaN.

12. The method of claim 1 further comprising:
   receiving a second instruction having a plurality of operands at the execution unit circuitry, and
   in response to execution of the second instruction at the execution unit circuitry, generating a propagated second NaN resultant for the second instruction, the second NaN resultant comprising a second NaN source indicator that indicates the resultant is not a propagated NaN.

13. A processing device comprising:
   instruction fetch circuitry of a data processor core to fetch a floating-point instruction having a plurality of operands; and
   execution unit circuitry of the data processor core to execute the instruction to determine a resultant, in response to the resultant being a NaN resultant, the execution unit circuitry to determine whether the NaN resultant was propagated from an operand, and, in response to determining that the NaN resultant was propagated from the operand, the execution unit circuitry is to store a first NaN source indicator that indicates the NaN resultant is a propagated NaN.

14. The processing device of claim 13, wherein the first NaN source indicator is stored at a predetermined location of the NaN resultant.

15. The processing device of claim 13, wherein the first NaN source indicator further identifies a source location of an operand of the plurality of operands that was propagated.

16. The device of claim 15, wherein each one of the plurality of operands is stored at a respective register that is identified by the instruction.

17. The device of claim 13, wherein the first NaN source indicator further identifies an operand of the plurality of operands that is a NaN operand.

18. The device of claim 13, wherein the NaN source indicator includes a plurality of mapped bits, each bit of the plurality of mapped bits mapped to a corresponding operand of the instruction, wherein the execution unit circuitry is to assert each bit of the plurality of mapped bits that is mapped to a NaN operand.

19. The device of claim 13, wherein in response to the execution unit circuitry determining that the NaN resultant is not propagated, the execution unit circuitry is to store a second NaN source indicator that indicates the NaN resultant was not propagated.

20. A method comprising:
  receiving a first instruction having a plurality of operands at execution unit circuitry of a data processor;
  fetching a NaN operand comprising a first NaN source indicator having a plurality of mapped bits, and a second NaN source indicator having a plurality of mapped bits; and
  generating a propagated NaN resultant comprising a third NaN source indicator having a plurality of bits, and a fourth NaN source indicator having a plurality of bits, wherein a portion of the third NaN source indicator is based upon a portion of the first NaN source indicator, and a portion of the fourth NaN source indicator is based upon a portion of the second NaN source indicator.

\* \* \* \* \*